INVENTORS
Max Kronenberg
Hans Ernst
Leigh W. Wright
ATTORNEY.

Patented Nov. 4, 1947

2,430,127

UNITED STATES PATENT OFFICE 2,430,127

THERMALLY CONTROLLED MACHINE TOOL

Max Kronenberg and Hans Ernst, Cincinnati, Ohio, assignors to The Cincinnati Milling Machine Co., Cincinnati, Ohio, a corporation of Ohio Application March 6, 1944, Serial No. 525,284

11 Claims. (Cl. 90—11)

1

This invention relates to milling machines and particularly to a system for controlling the temperature of those parts of a milling machine which are subject to localized heating during the operation of the machine.

An object of this invention is to provide in a milling machine efficient and effective means for controlling the temperature of certain parts of the machine and of the lubricant therefor that are subject to temperature changes during operation.

Another object is to provide means in a milling machine for maintaining the correct relationship between various parts of the machine that are subject to temperature changes during operation so as to retain the efficiency and accuracy of the machine under all operating conditions.

Another object of this invention is to provide in a milling machine, having certain parts that are subject to temperature changes during operation, means for circulating lubricating fluid in thermal transmitting relationship to said parts to maintain said parts and lubricant substantially at a desired temperature.

And a still further object is to provide a temperature control and lubricant distributing system for a milling machine transmission organization which effectively provides lubrication for all of the operating parts of the machine while dissipating localized heating which may develop in some of the operating parts of the machine and distribute said heat throughout the entire machine structure so as to effect a minimum temperature change uniformly distributed throughout the machine structure.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which similar reference numerals indicate the same or similar parts:

2

Figures 2, 3, 4:
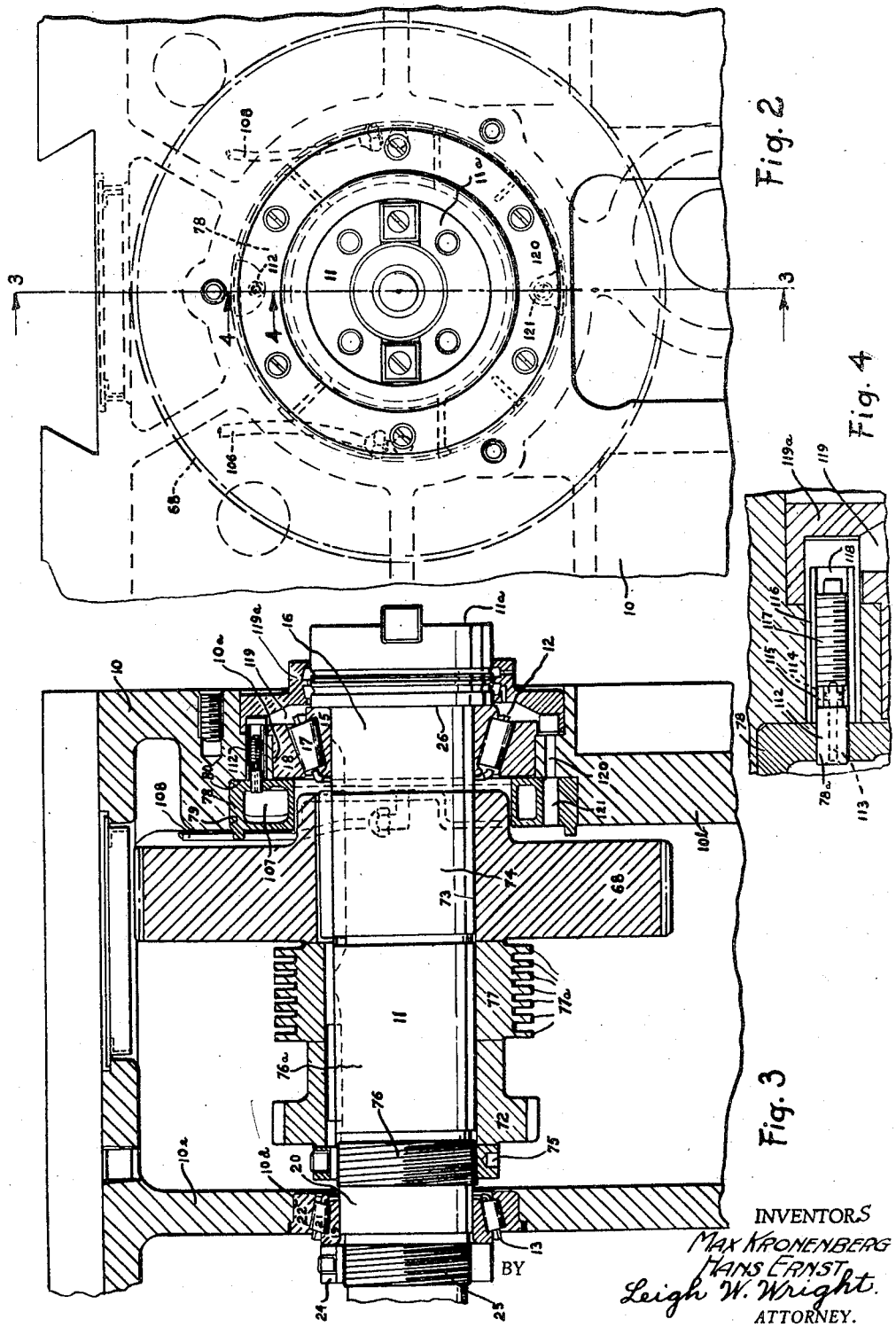
Figure 2 is a fragmentary enlarged front elevation of the milling machine column and spindle as indicated by the line 2—2 of Figure 1.

Figure 3 is a fragmentary enlarged section on the line 3—3 of Figure 2.

Figure 4 is a fragmentary enlarged sectional view on the line 4—4 of Figure 2.

The employment of high grade carbide cutting tools, as practiced at the present time in machine tool operations has necessitated a large increase in the cutting speeds for the work and cutter in machine tools. This is particularly the case in milling machines wherein the cutter spindle in a modern machine capable of utilizing such carbide cutting tools requires relatively rapid rotation and the utilization of a large amount of power for driving the spindle at these high rates of cutting speed. Because of these increased speeds and increased power transmission through the machine tool or milling machine, difficulty has been experienced with localized heating of certain of the machine parts, in particular the bearings, the cutter spindle, and the driving gear transmission for rotating the spindle. In order to maintain a high degree of accuracy in the finished work piece it is customary to closely adjust or preload the main cutter spindle bearings so as to prevent any lateral shifting of the cutter spindle with respect to the column of the machine. When the above-mentioned high speed rotation of the spindle is effected, however, the precise adjustment of the spindle bearings results in heat being developed in the bearing races which is transferred to the machine frame or column at localized points of mounting of these bearings causing irregular expansion of the machine column. As a result, the distance between tool and work changes, causing inaccurate finished surfaces to be machined on the work piece. Also, because of the high speed operation of the machine, heat is generated in the lubricant due to the rapid compression and agitation of the lubricating fluid by the rapidly moving parts of the machine.

Figure 1:
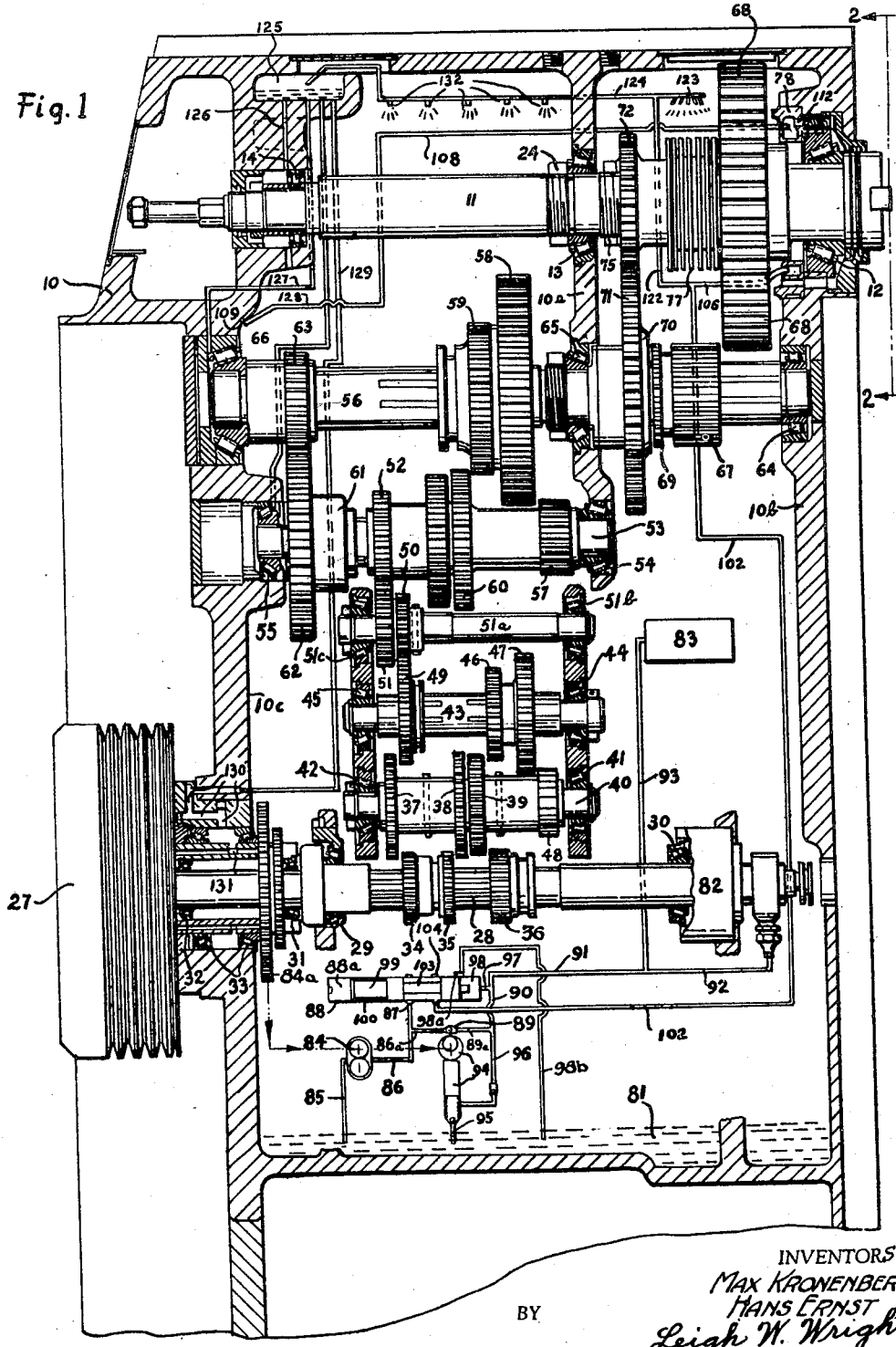
Figure 1 is a diagrammatic sectional view through the column and spindle transmission of a milling machine to which this invention is applied.

For illustrative purposes this invention is shown applied to a milling machine structure having a main frame or column 10 in which is journaled the cutter spindle 11 on a front main bearing indicated generally at 12, an intermediate main bearing indicated at 13 and a rear bearing 14. The front main bearing 12 in this specific embodiment is of the tapered roller bearing type having an inner race 15 fixed to the bearing portion 16 of the cutter spindle 11 upon which operate the rollers 17 which in turn engage the outer race 18 of the bearing. The outer race is carried in a bore 10a formed in the column 10 so as to take care of radial loads on the spindle and thrust loads toward the left as indicated in Figures 1 and 3. Intermediate bearing 13 comprises an inner race 19 which nicely fits in sliding engagement on the bearing portion 20 of the spindle 11 and upon which operate the rollers 21 which in turn engage the outer race 22 fixed in the bore 10d of the intermediate wall 10e of the machine frame or column 10. The bearing 13 is capable of taking care of radial loads on the spindle 11 and thrust loads in an axial direction toward the right as seen in Figures 1 and 3.

In order to maintain the bearings 12 and 13 in proper running relationship an adjusting nut 24 mounted on the threaded portion 25 of the cutter spindle 11 is provided which abuts against the inner race 19 of the bearing 13 so as to urge it to the right, Figure 3, and cause the inner race 15 of the bearing 12 to engage the flange portion 26 of the cutter spindle 11 so that by drawing up on the nut 24 these inner races 19 and 15 may be moved toward each other to adjust the respective rollers 17 and 21 into proper running contact with the outer races 18 and 22 in the column 10 of the machine to in this way provide an accurate rigid running condition for the spindle 11. The rear bearing 14 for the spindle 11 serves only to take care of radial movements of the work spindle at that point and essentially provides a steadying journal for the rear portion of the spindle.

The cutter spindle 11 may be driven by any suitable prime mover such as an electric motor (not shown) which drives the main driving clutch pulley 27, Figure 1. This clutch pulley is connected or disconnected in driving relationship with the pulley shaft 28 by any conventional clutch mechanism incorporated therein. This shaft 28 is mounted on suitable bearings 29 and 30 in the frame or column 10 of the machine and is also supported by bearings 31 and 32 of the clutch mechanism in the pulley 27 which, in turn, is supported on bearings 33 directly in the column 10 of the machine. On the pulley shaft 28 are the sliding driving gears 34, 35 and 36 which are respectively slidable into driving engagement with the gears 37, 38 and 39 fixed to a shaft 40 carried in suitable bearings 41 and 42 in the column 10 of the machine. Associated with the shaft 40 is shaft 43 journaled in bearings 44 and 45 in the column 10 on which is slidably mounted in driving relationship a gear couplet comprising the gears 46 and 47 which may be respectively engaged with the gears 39 and 48 fixed on the shaft 40.

On the shaft 43 is slidably mounted in driving relationship a reversing gear to effect rotation of the spindle 11 in one direction or the other comprising a shiftable gear 49 which may be slid axially on the shaft 43 to either engage a gear 50 of the gear couplet 50—51 on a shaft 51a journaled in bearings 51b and 51c in column 10, or to directly engage a gear 52 fixed on a shaft 53 journaled in suitable bearings 54 and 55 in the column 10. When the gear 49 is in engagement with the gear 50 the drive from the shaft 43 passes through gear 49, the gear couplet 50—51 to the gear 52 on the shaft 53 and when the gear is shifted to the left, Figure 1, on the shaft 43 the drive therefrom is transmitted directly from the gear 49 to the gear 52 to effect reverse in the shaft 53.

Three changes of speed drive to a back gear shaft 56 from the shaft 53 are effected by means comprising a low speed drive from a gear 57 fixed on the shaft 53, which is adapted to be engaged by the gear 58 of the gear couplet 58—59 when this couplet is shifted to the right, Figure 1; an intermediate speed driving of the back gear shaft 56 obtained by shifting the gear couplet 58—59 to the left, to engage its gear 59 with a gear 60 fixed on the shaft 53, and a high speed driving of the back gear shaft 56 by engaging a clutch 61, when the gear couplet 58—59 is in neutral as shown in Figure 1 which couples the gear 62 journaled on the shaft 53 in driving relationship with said shaft so that the gear 62 then drives the high speed gear 63 fixed on the back gear shaft 56.

The back gear shaft 56 is journaled in suitable bearings 64, 65, and 66 in the column 10 and carries a low speed shiftable back gear pinion 67 axially slidable in driving relationship on the shaft 56 for engagement with the large face gear 68 fixed on the cutter spindle 11. The pinion 67 also has clutch teeth 69 engageable with appropriate mating clutch teeth in the hub portion 70 of the high speed driving gear 71 journaled on the back gear shaft and which is constantly in mesh with a gear 72 fixed on the cutter spindle 11. In this way is provided a change speed transmission in the column of a milling machine for driving the cutter spindle through a wide range of different speeds and particularly providing a high speed drive for the spindle through the gears 62—63 and 71—72 when utilizing carbide cutting tools at high cutting speeds.

The cutter spindle 11 and the machine frame or column 10 are affected by heat arising from the interaction of the cutting tool with the work and heat generated by the rolling action particularly in the main bearing 12 of the work spindle 11. When an arbor and especially when a face milling cutter is mounted directly on the spindle nose 11a heat generated in the body of the cutter during the cutting operation is transferred to the work spindle 11 causing it to expand and change the adjustment of the spindle bearings 12 and 13. This results in looseness and in inaccurate rotation of the work spindle about its true axis. Also the front main bearing 12 for the cutter spindle 11 which sustains the major part of the forces imparted to the work spindle by the interaction of the cutter and work piece, generates heat as the rollers 17 roll around the races 15 and 18 due to inherent rolling friction in such bearings and also heat developed by the mechanical working of the lubricant by the rollers operating against the races in the bearing.

As a result, heat is transferred by the inner race 15 of the bearing 12 to the spindle 11. Heat is also conveyed through the outer race 18 to the bore 10a of the column 10 causing the associated portion of the column in the vicinity of the bearing 12 to be locally heated. As a result, the front wall 10b of the column tends to absorb heat and expand while the rear wall 10c of the column remains relatively cooler and unchanged causing the front bearing 12 and the spindle 11 to be raised upwardly relative to the rear bearing, thus causing misalignment of the work spindle from its true horizontal position and consequent inaccuracy in the work being machined. There are also various temperature changes which take place in the shafts of the change speed transmission for the cutter spindle due to the operation of the bearings supporting these shafts and the interaction of the gears mounted on these shafts which results in misalignments in the transmission, creating noise and vibration in the machine structure which ultimately affects the accuracy of the finished surfaces produced on the work.

In order to minimize the above-stated localized heating and distortion and reduce the overall heat developed in the machine structure, apparatus is provided for conducting the localized heating away from the heat generating areas and distributing the heat uniformly throughout the machine structure. Heat generated in the tool spindle is absorbed by a heat radiator mounted thereon as best seen in Figure 3. The large face gear 68 has a tapered bore 73 which securely fits over the tapered portion 74 formed on the cutter spindle 11. This gear 68 is held against the tapered portion 74 by a clamping nut 75 carried on the threaded portion 76 of the spindle 11, the nut engaging the gear 72 and a spindle heat radiating device or radiator in the form of a finned collar 77 having annular fins 77a formed on its periphery. Both the gear 72 and the spindle heat radiator 77 closely fit the portion 76a of the spindle 11 and abut against the gear 68 so that when the nut 75 is securely tightened the gear 72, the spindle heat radiator 77, and the gear 68 are located together in firm heat exchanging relationship with each other and with the cutter spindle 11. In this way heat developed in the cutter spindle 11 by interaction of the cutter and work, the bearing 12, and from the driving gears 68 or 72 mounted thereon, may be absorbed and removed from the spindle by the radiating fins 77a of the spindle heat radiator 77, especially when a lubricant and cooling medium is caused to continuously precipitate upon and flow through the spaces between the fins 77a during the operation of the machine.

Heat is absorbed from the front main bearing 12 for the cutter spindle 11 by the annular-shaped front bearing heat radiating device or heat radiator 78 which nicely fits in heat exchanging relationship in a bore 79 formed in the column 10 and firmly abuts against the inner face 80 of the bore 79 and closely adjacent the outer race 18 of the bearing 12 so as to directly receive and absorb any heat generated in the outer race 18 which may be transmitted through the bore 10a to the portion of column adjacent the annular radiator 78, and thereby tends to intercept or absorb heat transferred to the column 10 by the outer bearing race 18 of the bearing 12.

A combined lubricating and temperature control system cooperating with said spindle heat radiator and front bearing radiator is provided for the milling machine transmission organization comprising a main supply reservoir 81 formed in the column 10 below the transmission mechanism of the machine as best illustrated in Figure 1. Preferably, this reservoir is of large capacity for effectively maintaining the lubricating fluid at a uniform minimum temperature and to distribute any temperature rise in the fluid evenly throughout the lower portion of the machine column 10. Fluid from the reservoir is utilized to actuate certain power operated devices of the machine such as a servo-clutch control mechanism indicated generally at 82, and a hydraulic gear shifting control valve mechanism, indicated generally at 83. The system is also utilized to effect the proper lubrication of all of the moving parts of the above transmission and to dissipate and remove localized heating conditions which may occur at various points in the transmission during the operation thereof. Such a system may incorporate a large volume delivery gear pump 84, continuously driven by any suitable means such as the gear 84a connected to the clutch pulley 27 which is continuously rotated by a suitable prime mover (not shown), which withdraws lubricant through a line 85 from the reservoir 81 and transmits fluid under pressure through a line 86 to a port 87 of an automatic control valve 88 and also transmits pressure through the line 86, a branch line 86a through a check valve 89 and line 89a to the high pressure line 90 which is connected through lines 91 and 92 to the servo-clutch control mechanism 82 for the clutch pulley 27 and through a line 93 for the fluid pressure control valve 83 for effecting power shifting of the various shiftable gears 34—35, 36, 46—47, 58—59 and 67, and the clutch 61 for effecting speed changes in the spindle 11. Since the servo-clutch control mechanism 82 and the fluid pressure gear shifting control valve 83 and associated mechanism are of well-known construction and form no specific part of this invention, further detailed description of this apparatus will not be undertaken. A high pressure pump, indicated generally at 94, may also be driven from the gear 84a of the pulley 27. This pump withdraws fluid through a line 95 from the reservoir 81 and transmits pressure through the line 96 to the line 90, 91, and 92 to the servo-clutch control valve 82 and through the line 93 to the power gear shift control valve 83. A branch line 97 interconnects a closed pressure chamber 98 in the valve 88 so as to force the plunger 99 to the left, Figure 1, against a spring 100 until it abuts against the screw 88 when high pressure builds up in the line 90—91 after the connected servo-clutch control valve 82 and fluid pressure gear shifter control valve 83 have moved to desired predetermined positions. When this pressure builds up in chamber 98 to move the valve plunger 99, groove 103 in the valve plunger 99 is moved into communication with the port 87 and with an exhaust port 104 connected to the line 102 which supplies the full gear pump flow to the lubricating and cooling system of the machine. At the same time the port 98a of the valve 88 is opened a predetermined restricted amount to drain line 98b which returns the fluid to reservoir 81 by appropriate setting of the screw 88a to maintain the desired high pressure in chamber 98 and line 92. The pump 84 functions to assist the pump 94 when actuating the servo-clutch control valve 82 and the gear shifter control valve 83 in making changes therein by providing an additional supply of fluid through the check valve 89 and line 89a.

Thus, during the normal operation of the machine in performing cutting operations on the work, fluid pressure delivered by the pump 94 through the lines 96 and 90, the branch line 97, to the pressure chamber 98 of the valve 88, holds the valve plunger 99 in a shifted position to connect the pump 84 to the line 102 which has a branch line 106 connected into the annular cavity 107 of the front bearing heat radiator 78 for the bearing 12. Discharge from the annular cavity 107 passes out through a line 108 which conducts the fluid which has absorbed the heat from the front bearing 12 to an outlet point 109 from which it precipitates down against the rear wall 10c of the machine column 10 and returns to the reservoir 81. By this arrangement heat is absorbed from the bearing 12 as the fluid passes from the line 106 through the cavity 107 of the radiator 78 and this heat is carried away by the fluid passing out through the line 108 and conducted against the rear wall 10c of the column 10 so as to convey a certain amount of heat to cause this rear wall to cause its expansion to take place commensurate with the expansion of the front wall 10b of the column so that there will be a uniform distribution of heat in these two wall portions of the machine frame. It is obvious that this is desirable since it is not possible to completely remove all heat received from the bearing 12 by means of the radiator 78 so that a certain amount of compensating heat distribution to the rear wall 10c from the front wall 10b is effective to maintain proper alignment of the work spindle 11 in the column 10.

Also, a certain amount of lubricant from the cavity 107 in the front bearing radiator 78 is permitted to escape through a fluid resistance comprising a stud 112, as best seen in Figure 4, fixed in the bore 78a of the radiator 78 through which is provided an axial bore 113 terminating in a diametral bore 114 which opens into an annular groove 115 surrounded by a sleeve 116 mounted on the threaded portion 117 of the stud 113 so that fluid escapes from the annular groove 115 through the threaded portion between the sleeve 116 and the threaded portion 117 of the stud 112 at a predetermined desired rate. The lubricant escapes through the opening 118 in the end of the sleeve 116 and passes into the chamber 119 formed by the front bearing cover plate 119a where it may flow over the bearing rollers 17 and races 15 and 18 of the front bearing 12. Excess fluid from the chamber 119 passes out through a drain opening 120, Figure 3, formed in the front wall 10b of the column 10 and out through an aligned drain opening 121 in the radiator 78 from which the fluid drains down the front wall 10b to return to reservoir 81. This drainage serves to provide a similar transfer of heat from the lubricant escaping from the chamber 107 and to dissipate this heat by washing through the front wall 10b of the column in the same fashion that the coolant is distributed at the point 109 to further equalize any heat expansion in the column 10.

Referring to Figure 1, the line 102 also has a second branch line 122 to which is connected a lubricant distributing spray 123 located at the top of the column and transmission mechanism and particularly associated with the spindle heat radiator 77 on the cutter spindle 11. The fins 77a of the heat radiator 77 receive discharge from the lubricant spray 123 which continuously plays fluid over the spindle and radiator during operation of the machine. Heat developed in the spindle 11 thus is dissipated by means of the radiator 77 to prevent heat from accumulating which would otherwise cause expansion of the spindle with the resultant looseness and change in adjustment of the bearings 12 and 13. The spray 123 also provides effective lubrication for the gears 67 and 68 and the gears 71 and 72 and associated bearings 13 and 65.

The line 122 has a branch line 124 which continuously discharges fluid into an upper lubricant reservoir 125 formed in the column 10 of the machine. From this reservoir extends a series of lubricating discharge lines 126 which serve to deliver lubricant to the bearing 14 on the rear of the spindle 11. Lines 127 and 128 respectively provide lubrication for the bearing 66 of the shaft 56 and the bearing 55 of the shaft 53. A line 129 serves to supply lubricant through passageways 130 to the bearings 33 for the main drive pulley shaft 28 and through an appropriate passageway 131 to bearings 31 and 32 also associated with the driving pulley 27. A series of spray nozzles 132 are provided in the line 124 at the top of the column to provide lubricant which pours over the shafts 56, 53, 51a, 40, and 28 and associated bearings and gearing otherwise not specifically lubricated from the spray 123 and reservoir 125 to thereby prevent localized heating and excessive temperature changes in these parts.

In this way a temperature control and lubricating system has been provided for a milling machine to effectively absorb localized heating which particularly develops in the column, cutter spindle, and driving transmission during the operation of the machine at high speeds and to dissipate this heat throughout the machine structure to increase the overall operating efficiency and accuracy of the machine.

What is claimed is:

1. A temperature control system for a milling machine having a column, a cutter spindle, and bearing means rotatably mounting said spindle in said column, including a bearing heat radiator mounted on said column to receive heat generated by said bearing means, a spindle heat radiator comprising a series of axially spaced radially disposed fins fixed on said spindle in a position proximate the bearing to absorb heat imparted to said spindle by said bearing means, a lubricant reservoir in said column, a pump for circulating fluid from said reservoir through said radiators to effect withdrawal of heat from said bearing and spindle during the operation of said machine.

2. In a milling machine having a column, a cutter spindle, and bearing means for rotatably supporting said spindle in front and rear walls of said column, the combination of a heat radiator associated with the bearing means in said front wall, a heat radiator associated with said spindle, a lubricant reservoir in said column, means for circulating lubricant from said reservoir through said heat radiators, and means for conducting the lubricant discharge from the radiator associated with the bearing means in the front wall to the rear wall of said column to equalize the temperature in both of said walls.

3. In a milling machine having a column, front, rear, and intermediate walls in said column, a cutter spindle journaled in bearings against radial and axial movement in said front and intermediate walls and against radial movement in said rear wall, the combination of a front bearing temperature radiator mounted in the front wall of said column adjacent the bearing in said front wall, a fluid conducting cavity in said radiator, a lubricant fluid reservoir in said column, pumping means for supplying fluid from said reservoir to said cavity to circulate said fluid therein in thermal transmitting relationship to said front wall and bearing, and means for conducting and distributing the discharge from said cavity in thermal transmitting relationship over the rear wall of said column.

4. In a milling machine having a column, a rotatable cutter spindle journaled in said column at a plurality of mounting positions, and bearing means for supporting said spindle at each of said positions, the combination of a heat radiator for one of said bearing means, a lubricant reservoir formed in said column, fluid pressure delivering means conveying fluid from said reservoir to said heat radiator for circulating said fluid in said radiator in thermal transmitting relationship to said bearing to absorb heat developed therein by the rotation of said spindle, and means for conveying fluid from said heat radiator at one mounting position to another mounting position so as to equalize the relative temperatures at said mounting positions.

5. In a milling machine having a column, a rotatable cutter spindle, a front bearing rotatably supporting said spindle in the front wall of said column, an intermediate bearing rotatably supporting said spindle in said column cooperating with said front bearing to accurately confine movements of said spindle both axially and radially under a preloaded operating condition, a rear steady bearing for said cutter spindle mounted in the rear wall of said column, the combination of a heat radiator mounted in said front wall of said column in thermal transferring relationship to said front bearing to receive heat generated therein during rotation of said spindle, a fluid reservoir in said column, a fluid pump receiving its supply of fluid from said reservoir, means for connecting the supply of said pump to said radiator for said front bearing, a cavity in said radiator to receive said fluid supply from said pump, means for conveying a restricted amount of fluid from said cavity to said front bearing, means for receiving drainage from said front bearing and distributing said drainage in thermal transferring relationship on the front wall of said column, and means for receiving drainage from said cavity in said radiator and distributing it in thermal transferring relationship on the rear wall of said column to effect equalization of the temperature in said walls.

6. In a temperature control system for a milling machine structure having a column, a cutter spindle, a front bearing rotatably supporting said spindle in the front wall of said column, an intermediate bearing supporting said spindle in an intermediate wall of said column and cooperating with said front bearing to confine said spindle against axial and radial movements relative to said column, and a rear steady bearing for said spindle mounted in the rear wall of said column, the combination of a heat radiator mounted in said column adjacent said front bearing, a spindle heat radiator mounted on said spindle between said front bearing and said intermediate bearing, a lubricant fluid supply reservoir formed in the base of said column below said work spindle and supporting bearings, a fluid pressure pump adapted to withdraw fluid from said reservoir and deliver it to each of said radiators to absorb the heat therefrom, said fluid returning to said reservoir by gravity, and means whereby the discharge from said radiator in the column for said front bearing discharges said fluid simultaneously in thermal transferring relationship on said front and rear walls of said column.

7. In a lubricating and temperature control system for a milling machine having a column, a cutter spindle, front, rear, and intermediate walls formed integral with said column, bearings in each of said walls for rotatively supporting said cutter spindle, a change speed transmission in said column associated with said work spindle and adapted to operate said work spindle at a plurality of different cutting speeds, the combination of a lubricating fluid reservoir in the base of said column, a fluid pressure pump in said column driving its source of fluid from said reservoir, a heat radiator, receiving the discharge of fluid from said pump, associated with the bearing supporting said cutter spindle in said front wall, a heat radiator mounted on said cutter spindle receiving discharge from said pump, a general spray lubricator for said change speed transmission, and an upper lubricant reservoir in the top of said column continuously supplied with fluid from said pump, means for interconnecting said last-mentioned reservoir to a series of bearings supporting said change speed transmission in the rear wall of said column, and means whereby the discharge from said first-mentioned radiator is distributed in thermal transferring relationship on the rear wall of said column to effect equalization of the temperature in the front and rear walls of said column.

8. In a milling machine, a column having a front, rear, and intermediate wall formed integral therewith, a cutter spindle rotatively mounted in a bearing in each of said walls, a change speed transmission in said column adapted to rotate said cutter spindle at a plurality of different speeds, a lubricating fluid reservoir in the bottom of said column adapted to receive all lubricant delivered to said spindle, bearings, and change speed transmission, the combination of a heat radiator associated with the spindle bearing in said front wall mounted in said column to receive heat developed in said bearing and transmitted to said column, a heat radiator on said spindle adapted to receive heat developed in said spindle by said bearings or a cutter mounted on said spindle, a fluid delivery pump receiving fluid from said reservoir and transmitting it to each of said radiators, means for conducting exhausted fluid from said radiator associated with the front bearing in part to said front bearing and from said bearing to said front wall of said column and in part to the rear wall of said column so as to equalize the temperatures in said front and rear walls of said column, and means for conducting some of said fluid from said pump over the change speed transmission for said work spindle to lubricate and absorb heat developed therein.

9. In a milling machine, a column having a front, rear, and intermediate wall formed integral therewith, a cutter spindle rotatively mounted in a bearing in each of said walls, a change speed transmission in said column adapted to rotate said cutter spindle at a plurality of different speeds, a lubricating fluid reservoir in the bottom of said column adapted to receive all lubricant delivered to said spindle, bearings, and change speed transmission, the combination of a heat radiator associated with the spindle bearing in said front wall to receive heat developed in said bearing and column, a heat radiator on said spindle adapted to receive heat developed in said spindle by said bearings or a cutter mounted on said spindle, a fluid delivery pump receiving fluid from said reservoir and transmitting it to each of said radiators, means for conducting exhausted fluid from said radiator associated with the front bearing in part to said front bearing and front wall of said column and in part to the rear wall of said column so as to equalize the temperatures in said front and rear wall of said column, means for conducting some of said fluid from said pump over the change speed transmission for said work spindle to lubricate and absorb heat developed therein, and means whereby said fluid supply pump may momentarily serve to effect speed changes in said speed change transmission or to render said speed change transmission and spindle operative or inoperative.

10. In a temperature control system for a milling machine organization having a hollow column, a cutter spindle and a drive transmission therefor contained within the column, a pair of bearing members carried by the column for rotatably supporting the spindle against axial movement, said cutter spindle and bearings being subject to heating due to the reaction of a cutter mounted on the spindle during a machining operation, the combination of a lubricant supply system for the parts within the column including a fluid reservoir, an annular heat radiating device contained within the column in proximity to the spindle and in heat transferring relationship with the bearing, a second heat radiator directly mounted on the spindle intermediate the supporting bearings therefor, said second member having axially spaced peripheral cooling fins, a fluid supply pump, means for delivering fluid from the pump into heat transferring relation to both of said heat radiating devices whereby said fluid is brought into thermal transmitting relationship with said radiating devices to absorb the localized heat developed in the spindle and bearing during a machining operation, and means for distributing the fluid after engagement with the radiating devices throughout the hollow column to equalize the general temperature conditions in the machine structure.

11. The combination with a machine tool structure including a hollow frame unit, a rotatable spindle and a plurality of axially spaced bearing means for rotatably supporting said spindle in said frame, of means for thermally conditioning the structure to minimize unequal expansions therein comprising an internal liquid cooling annular ring circumscribing the spindle mounted on the frame in heat absorbing relation to one of the bearing means and a second annular member carried by the spindle intermediate said bearing means, said second member having a multiplicity of peripheral cooling fins, a lubricant reservoir, and means for circulating lubricant by way of said annular radiating means and in thermal transferring relationship thereto to remote portions of the frame whereby equalization of temperature conditions therein is effected.

MAX KRONENBERG.
HANS ERNST.

REFERENCES CITED

The following references are of record in the file of this patent:

UNITED STATES PATENTS

| Number | Name | Date |
|---|---|---|
| 1,782,235 | Kearney et al. | Nov. 18, 1930 |
| 1,832,487 | Kearney et al. | Nov. 17, 1931 |
| 2,142,931 | Baker | Jan. 3, 1939 |
| 2,055,651 | Burrell | Sept. 29, 1936 |
| 2,093,757 | Godfriaux | Sept. 21, 1937 |
| 2,279,569 | Jelinek et al. | Apr. 14, 1942 |
| 1,617,460 | Schmidt | Feb. 15, 1927 |
| 1,718,562 | Schmidt | June 25, 1929 |
| 2,012,082 | Hieber et al. | Aug. 20, 1935 |